A. J. KOLANKO.
VEHICLE FENDER.
APPLICATION FILED JAN. 11, 1913.
1,085,613.
Patented Feb. 3, 1914.
2 SHEETS—SHEET 1.
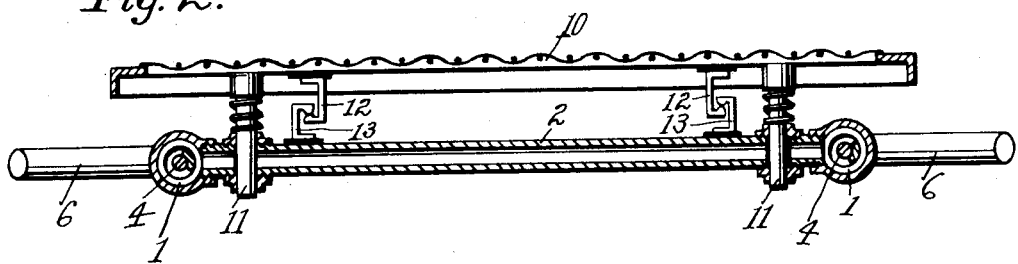
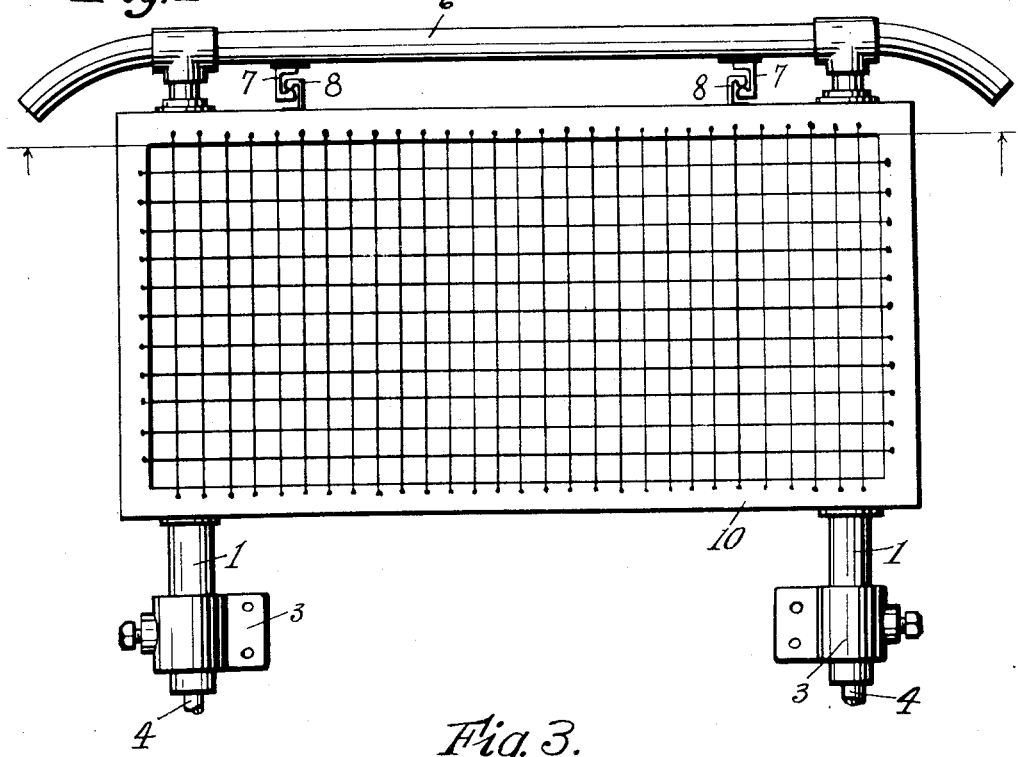
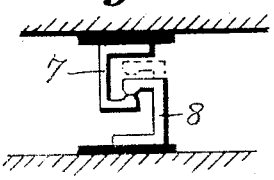
Witnesses:
T. Colson
B. G. Richards
Inventor:
Antoni J. Kolanko,
By Joshua R. H. Ross
his Attorney.

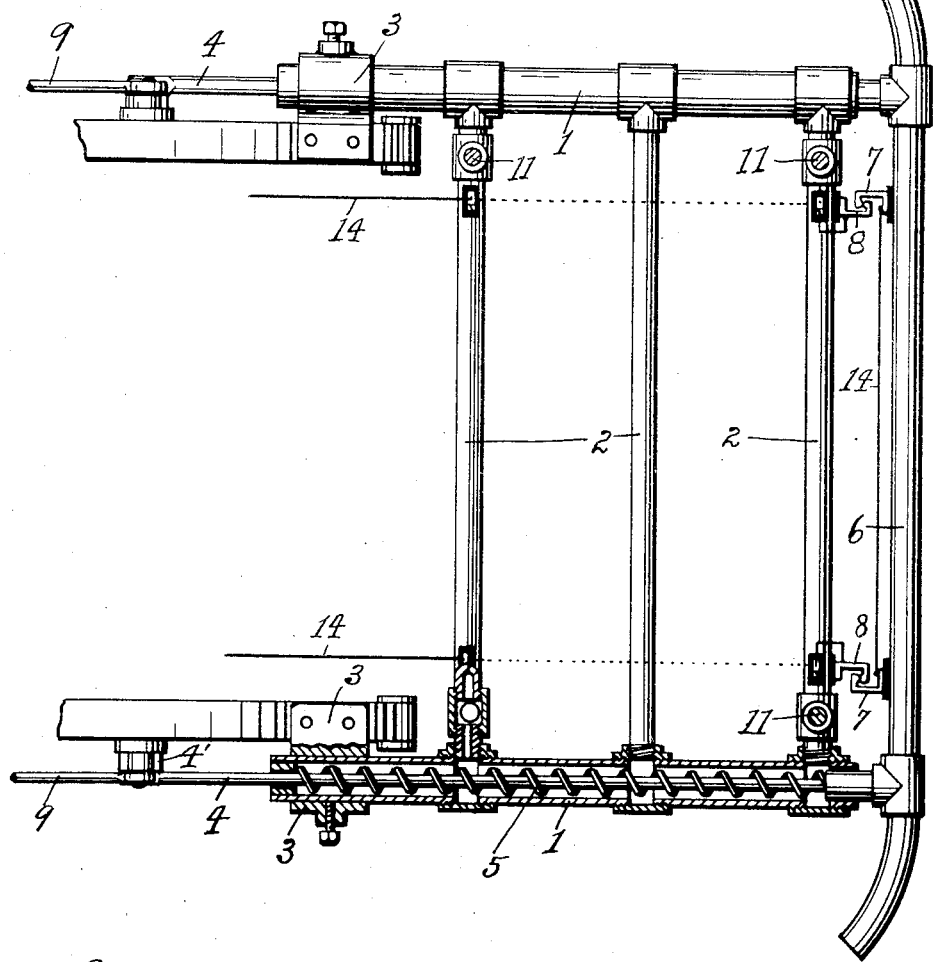
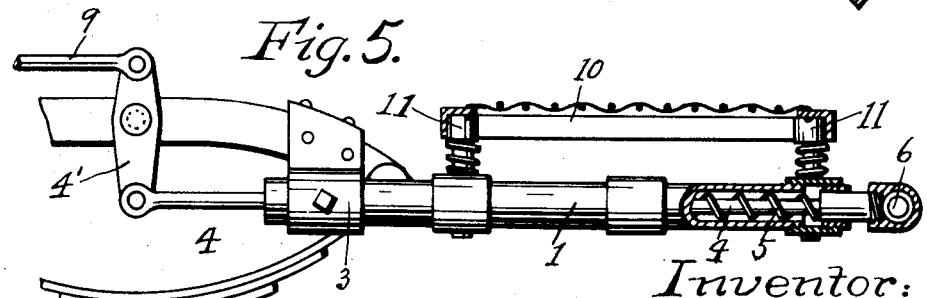

UNITED STATES PATENT OFFICE.

ANTONI J. KOLANKO, OF CHICAGO, ILLINOIS.

VEHICLE-FENDER.

1,085,613.      Specification of Letters Patent.      Patented Feb. 3, 1914.

Application filed January 11, 1913. Serial No. 741,409.

*To all whom it may concern:*

Be it known that I, ANTONI J. KOLANKO, a citizen of the United States, and a resident of the city of Chicago, county of Cook, and State of Illinois, have invented certain new and useful Improvements in Vehicle-Fenders, of which the following is a specification.

My invention relates to improvements in fenders for vehicles, and has for its object the provision of an improved fender especially adapted for use in conjunction with automobiles, cars and the like.

The invention consists in the combinations and arrangements of parts hereinafter described and claimed.

The invention will be best understood by reference to the accompanying drawings forming a part of this specification, and in which, Figure 1 is a top plan view of a fender embodying my invention, Fig. 2, a transverse section of the fender, Fig. 3, an enlarged detail view illustrating a circuit breaker employed in the construction, Fig. 4, a top plan view of the fender with portions removed and other portions shown in section, and Fig. 5, a side elevation of the fender shown partially in section.

The preferred form of construction, as illustrated in the drawings comprises a supporting frame constructed of pipes 1 constituting side bars and pipes 2 secured to pipes 1 and constituting cross bars of the frame. At their rear ends the pipes 1 are provided with supporting brackets 3 adapted to be secured to the forward portion of an automobile or other vehicle body. Reciprocatory rods 4 are arranged in pipes 1 and springs 5 are imprisoned in said pipes and arranged to hold rods 4 in their forward position. A fender bar 6 is secured to the forward ends of rods 1 and circuit breaker members 7 are secured to fender bar 6 and coöperate with circuit breaker members 8 on the forward bar 2 of the supporting frame, to break an electric circuit upon rearward movement of said fender bar. The rear ends of rods 4 are connected with operating levers 4' and these levers are connected by means of links 9 with a brake mechanism or other operating mechanism of the vehicle, as desired. When the fender is used in conjunction with an automobile one of the links 9 is connected with the ordinary brake mechanism of the automobile, so that upon rearward movement of fender bar 6 the brake of the automobile will be automatically applied to stop the vehicle upon collision thereof with a person or other object. When the fender is used on a street car, one of the links 9 is connected with the ordinary air brake controller thereof and the other link 9 is connected with the current controller, so that upon rearward movement of fender bar 6, the air brakes of the car are applied and the current automatically cut off. This action automatically stops the progress of the car and thus tends to avoid accidents or to make unavoidable accidents less serious.

A receiving platform 10 is arranged on the supporting frame and is made downwardly yieldable by supporting the same on spring-held posts 11 reciprocating vertically in the supporting frame. At each corner receiving frame 10 is provided with a circuit breaker 12 coöperating with a corresponding circuit breaker 13 on the corresponding portion of the supporting frame, whereby an electric circuit may be broken upon depression of any corner of receiving frame 10. When the fender is used on an automobile, the different circuit breaker members 7, 8, 12 and 13 are all connected in series by means of wires 14 in the ordinary ignition circuit of the automobile, so that upon rearward movement of fender bar 6 or upon depression of any part of receiving frame 11, the ignition circuit for the automobile will be automatically broken and the engine instantly stopped.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. The combination with a vehicle, of a fender comprising two pipes constituting the side bars of a supporting frame; means for securing the rear ends of said side bars to the vehicle; spring-held reciprocatory rods in said pipes; a fender bar secured to the forward ends of said rods; a downwardly yieldable receiving platform on said supporting frame; an electric circuit for said vehicle; circuit breakers connected in said circuit in series and arranged to be operated by said fender bar and platform; and an operative connection with one of said rods arranged to apply the brake of said vehicle, substantially as described.

2. The combination with a vehicle, of a fender comprising two pipes constituting the side bars of a supporting frame; means for securing the rear ends of said side bars to the vehicle; spring-held reciprocatory rods in said pipes; a fender bar secured to the forward ends of said rods; a downwardly yieldable receiving platform on said supporting frame; an operative electric circuit for said vehicle; a circuit breaker connected in said circuit and arranged to be operated by said fender bar; a circuit breaker in said circuit and arranged at each corner of said platform to be operated by downward movement thereof, all of said circuit breakers being connected in series in said electric circuit; and an operative connection with one of said rods arranged to apply the brake of said vehicle, substantially as described.

In testimony whereof I have signed my name to this specification in the presence of two subscribing witnesses.

ANTONI J. KOLANKO.

Witnesses:
JOSHUA R. H. POTTS,
A. A. OLSON.